Feb. 2, 1960 G. E. PRICE 2,923,802
MULTIPLE ELEMENT HEATING UNITS
Filed May 12, 1958

INVENTOR
GEORGE E. PRICE
BY Raymond J. Ridge
ATTORNEY

United States Patent Office 2,923,802
Patented Feb. 2, 1960

2,923,802

MULTIPLE ELEMENT HEATING UNITS

George E. Price, Mansfield, Ohio, assignor to Westinghouse Electric Corporation, East Pittsburgh, Pa., a corporation of Pennsylvania Application May 12, 1958, Serial No. 734,757

3 Claims. (Cl. 219—37)

This invention relates to heating units having multiple, sheathed heating elements and has for an object to provide an improved unit of this kind.

A further object of the invention is to obviate "cold areas" in multiple element heating units used, for example, on the cooking platform of electric ranges.

Range heating units of the class set forth usually include two or more convoluted, sheathed elements arranged generally concentrically and aligned to form a horizontal cooking surface. The elements include a tubular sheath within which a heating coil is imbedded in a compacted mass such as magnesium oxide, and the terminals for the coil extend outwardly from the ends of the sheath. The elements are spirally convoluted, and one is arranged within the other to define a generally circular flat heating surface, as is well understood. The outer end of the inner element and the inner end of the outer element are adjacent in an intermediate portion of the heating surface of the unit and are bent downwardly and outwardly beneath the outer element for rendering the terminals accessible. In this form of heating unit, there is a cold spot or area at said intermediate portion of the cooking surface where the ends of the inner and outer elements are bent downwardly. This cold area prevails because the heating coil does not extend around the downward bends, so that there is a relatively large unheated space between the ends of the heating coils. Furthermore, the relatively cool unheated ends of the element sheaths enclosing the terminals conduct heat away from the effective heating area. This causes uneven heating of a cooking vessel being heated, which is very objectionable.

In accordance with this invention, the downwardly bent ends of the elements are formed so that they may be crossed or overlapped, whereby the effective heating portions of the elements containing their enclosed heating coils are drawn closely together, obviating the cold area in the heating surface.

The foregoing and other objects are effected by the invention as will be apparent from the following description and claims taken in connection with the accompanying drawings, forming a part of this application, in which:

Figure 1:
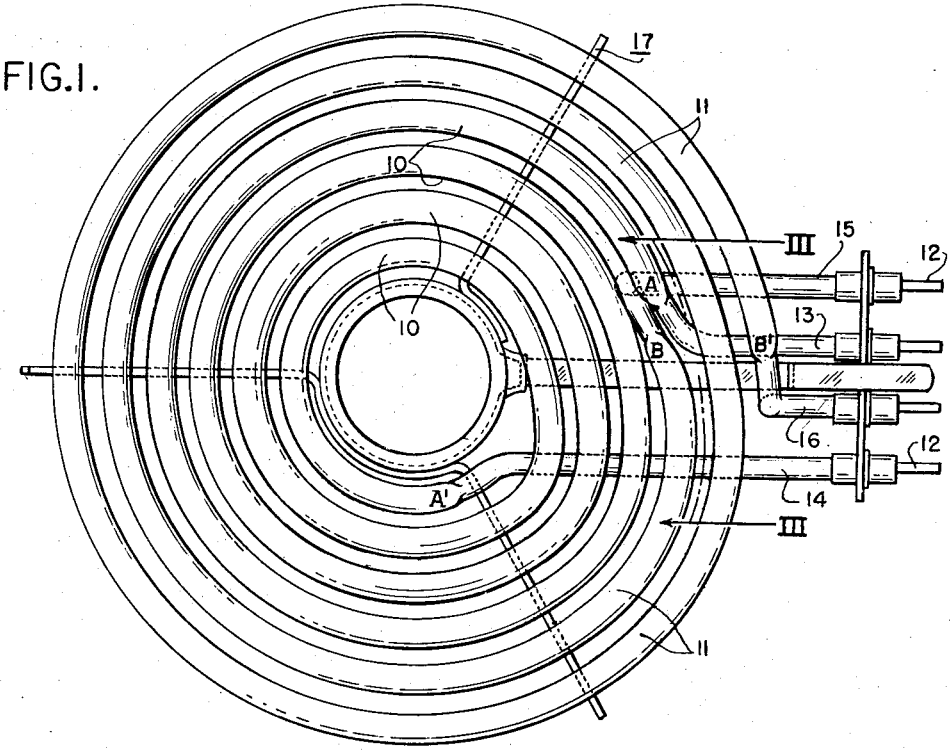
Fig. 1 is a plan view of a heating unit constructed and arranged in accordance with this invention.

Reference will now be had to the drawing wherein a multiple element heating unit constructed in accordance with the invention is disclosed. This unit includes an inner heating element 10 arranged within and encompassed by an outer element 11. The elements 10 and 11 and are of the tubular sheathed type wherein a heating coil is embedded in insulating compacted material, such as magnesium oxide, within a metallic tubular sheath. The ends of the tubular sheaths enclose terminals 12 which are electrically connected to the heating coil within the sheath. The terminal ends of the inner element 10 are indicated at 13 and 14 and the terminal ends of the element 11 are shown at 15 and 16. The heated portion of the element 10 or that portion of the sheath containing the heating coil extends between the regions of the sheath indicated by A—A¹ while the heated portion of the element 11 extends between the regions indicated by B—B¹.

Figure 2:
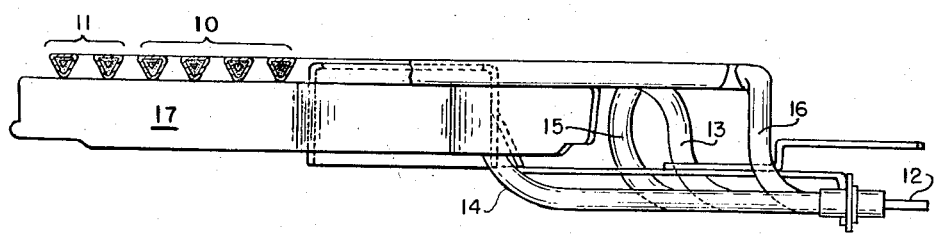
Fig. 2 is a side elevation of the unit with portions broken away for clearness.

The heated portions of the elements are usually flattened, as best shown in Fig. 2, and define the heating surface which is generally of circular configuration as shown in Fig. 1. The heated portions of the elements 10 and 11 are convoluted spirally as shown, the spiral of the element 11 complementing the spiral of the element 10. In accordance with usual practice, the terminal portions 13 to 16, inclusive, of the elements 10 and 11 are curved or bent downwardly from the heated portions of the elements and then radially outwardly in order to render the terminals 12 accessible. The elements 10 and 11 are secured together in any suitable manner, such as, for example, by means of a three-armed supporting bracket 17 to which the elements may be welded.

The heater unit, as described, up to the present, is of well understood construction so that further description is deemed unnecessary. In multiple element units of the type described, where the outer element 11 surrounds the inner circular element 10 generally in concentric relation, a cold area on the heating surface has prevailed where the outer unheated end 13 of the inner element 10 and the inner unheated end 15 of the outer element 11 are bent downwardly. This condition obtains because the heating coil does not extend into or through the downwardly curved portions of the ends of the sheaths for manufacturing reasons and, obviously, because this portion of the sheath is outside the plane of the heating surface of the unit. It will be understood that, in prior devices, the positions of the unheated ends 13 and 15 are the reverse of the showing in Fig. 1; the end 13 being connected to the region B of the outer element 11 and the end 15 being connected to region A of the inner element 10. Accordingly, the arcuate spacing between the heated regions A and B in prior devices is large, and is the main contributor to the cold area in the heating surface.

Figure 3:
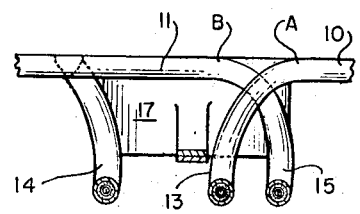
Fig. 3 is a section taken along the line III—III of Fig. 1.

In accordance with this invention, the unheated ends 13 and 15 of the respective inner element 10 and outer element 11 are offset and crossed as shown best in Figs. 1 and 3 so that, the ends A and B of the heated regions of the sheath are juxtaposed, as shown. This close spacing of these heated regions obviates any cold area at this portion of the heating surface and represents a distinct improvement over known prior devices of this class.

From the foregoing, it will be apparent that an improved heating unit for use primarily in electric range platforms is provided wherein objectionable cold areas within the heating surface are obviated. All other advantages of multiple element units of this general type are retained and the present invention can be incorporated in the design with substantially no increased cost of manufacture.

While the invention has been shown in but one form, it will be obvious to those skilled in the art that it is not so limited, but is susceptible of various other changes and modifications without departing from the spirit thereof.

I claim:

1. A multiple element heating unit including inner and outer heating elements, each including a sheath having a heating coil in the active heated portion of the sheath and terminals extending from the unheated end portions of the sheath, said elements being convoluted spirally in a common horizontal plane and said outer element encompassing and complementing the inner element for forming a heating surface, the outer unheated end of the inner element and the adjacent inner unheated end of the outer element extending downwardly and outwardly beneath the outer element, said downward extending unheated ends of the inner and outer elements being crossed, the construction and arrangement being such that the ends of the active heated portions of the elements are disposed in closely spaced relation.

2. A multiple element heating unit including inner and outer heating elements, each element including a sheath enclosing a heater wire in an active, heated portion of the sheath intermediate its ends and terminals for the wire extending through the ends of the sheath, said heated portions of the sheaths being convoluted in a common horizontal plane for forming a heating surface and said ends of the sheaths being curved downwardly, the outer end of the inner sheath and the inner end of the outer sheath being offset and crossed adjacent said horizontal plane for juxtaposing the adjacent ends of the active heated portions of the inner and outer sheaths.

3. A heating unit including concentric inner and outer heating elements forming a horizontal, generally circular heating surface, each of said elements including a tubular sheath having unheated terminal portions and a heated portion intermediate the terminal portions, said heated portions of the sheaths being spirally convoluted and complementary, the adjacent terminal portions at the inner end of the outer sheath and the outer end of the inner sheath being bent downwardly and offset relative to the arc of the spiral convolution in the region of said adjacent terminal portions, said adjacent terminal portions being crossed for disposing the ends of the heated portions of the sheaths in closely spaced relation.

References Cited in the file of this patent

FOREIGN PATENTS 1,101,045   France _____ Sept. 27, 1955